United States Patent
Stephan et al.

(10) Patent No.: US 12,166,671 B2
(45) Date of Patent: Dec. 10, 2024

(54) METHOD FOR DISCOVERING INTERMEDIATE FUNCTIONS AND FOR SELECTING A PATH BETWEEN TWO PIECES OF COMMUNICATION EQUIPMENT

(71) Applicant: ORANGE, Issy-les-Moulineaux (FR)

(72) Inventors: Emile Stephan, Chatillon (FR); Frederic Fieau, Chatillon (FR); Gael Fromentoux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 380 days.

(21) Appl. No.: 17/254,553

(22) PCT Filed: Jun. 7, 2019

(86) PCT No.: PCT/FR2019/051386
§ 371 (c)(1),
(2) Date: Dec. 21, 2020

(87) PCT Pub. No.: WO2019/243706
PCT Pub. Date: Dec. 26, 2019

(65) Prior Publication Data
US 2021/0273882 A1    Sep. 2, 2021

(30) Foreign Application Priority Data

Jun. 22, 2018    (FR) ..................................... 1855615

(51) Int. Cl.
*H04L 29/06*    (2006.01)
*H04L 45/02*    (2022.01)
*H04L 45/302*    (2022.01)

(52) U.S. Cl.
CPC ............ *H04L 45/306* (2013.01); *H04L 45/02* (2013.01)

(58) Field of Classification Search
CPC .............................. H04L 45/306; H04L 45/02
See application file for complete search history.

(56) References Cited

U.S. PATENT DOCUMENTS

| | | | |
|---|---|---|---|
| 2004/0107286 A1* | 6/2004 | Larson | H04L 63/061 709/229 |
| 2006/0203808 A1* | 9/2006 | Zhang | H04L 47/724 370/352 |

(Continued)

OTHER PUBLICATIONS

International Search Report dated Nov. 11, 2019 for corresponding International Application No. PCT/FR2019/051386, filed Jun. 7, 2019.

(Continued)

*Primary Examiner* — Christopher B Robinson
(74) *Attorney, Agent, or Firm* — David D. Brush; Westman, Champlin and Koehler, P.A.

(57) ABSTRACT

A method allowing execution of transmission functions hosted in intermediate pieces of equipment of a path established between two pieces of communication equipment. End-to-end encryption systems are designed to resist any surveillance or tampering attempt, as no third party can decrypt or modify the communicated data. There is a solution which, depending on the connection opening requests of the applications, allows to select and assemble the transport protocols necessary for the operation of the application. However, this method is local: this protocol stack is only assembled at the pieces of communication equipment constituting the ends of the connections. Consequently, the requests emitted by these applications are not transmitted to the intermediate pieces of equipment which host the desired functions. The method allowing execution of transmission functions allows to re-establish cooperation between pieces of communication equipment, constituting the ends of a connection, with intermediate nodes hosting transmission functions.

18 Claims, 3 Drawing Sheets

(56) References Cited

U.S. PATENT DOCUMENTS

| | | | |
|---|---|---|---|
| 2010/0166005 A1* | 7/2010 | Jounay | H04L 45/00 370/401 |
| 2012/0106955 A1* | 5/2012 | Le Rouzic | H04L 12/2801 398/45 |
| 2015/0032871 A1* | 1/2015 | Allan | H04L 47/125 709/223 |
| 2015/0326473 A1 | 11/2015 | Dunbar et al. | |
| 2018/0241727 A1* | 8/2018 | Verzun | H04L 63/102 |
| 2019/0280914 A1* | 9/2019 | Menon | H04L 43/08 |
| 2019/0296997 A1* | 9/2019 | Menon | H04L 69/40 |

OTHER PUBLICATIONS

Written Opinion of the International Searching Authority dated Nov. 11, 2019 for corresponding International Application No. PCT/FR2019/051386, filed Jun. 7, 2019.

J. H. Moon et al., "The Concatenation of IP Packets draft-moon-ipsec-ipconc-00.txt", IP Security Protocol Working Group (IPSEC), Internet-Draft, Dec. 2, 2002.

French Search Report and Written Opinion dated Jan. 29, 2019 for corresponding French Application No. 1855615, filed Jun. 22, 2018.

English translation of Written Opinion of the International Searching Authority dated Nov. 21, 2019 for corresponding International Application No. PCT/FR2019/051386, filed Jun. 7, 2019.

* cited by examiner

METHOD FOR DISCOVERING INTERMEDIATE FUNCTIONS AND FOR SELECTING A PATH BETWEEN TWO PIECES OF COMMUNICATION EQUIPMENT

CROSS-REFERENCE TO RELATED APPLICATIONS

This Application is a Section 371 National Stage Application of International Application No. PCT/FR2019/051386, filed Jun. 7, 2019, which is incorporated by reference in its entirety and published as WO 2019/243706 A1 on Dec. 26, 2019, not in English.

FIELD OF THE INVENTION

The field of the invention is that of data transmission. More specifically, the invention relates to a method allowing the discovery, selection and activation of functions, called transmission functions, hosted in intermediate pieces of equipment of a path established between two pieces of communication equipment.

1. PRIOR ART AND ITS DISADVANTAGES

End-to-end encryption (E2EE) is a technique used in communication systems where only pieces of communication equipment that have established a connection to each other can access the content of some data transmitted by means of the connection, the data useful for routing can be unencrypted.

End-to-end encryption systems are designed to resist any attempt to monitor or modify data, as no third party can decrypt and therefore access the communicated data without having the security keys used for encryption and decryption.

Thus, the content of the messages transmitted to the receiver piece of communication equipment is locally encrypted by the emitting piece of communication equipment even before the messages are sent through the connection, established on a communication path comprising intermediate pieces of equipment. These intermediate pieces of equipment, of the "middlebox" type for example, only relay the encrypted messages from the unencrypted routing data, and it is the receiver piece of communication equipment which decrypts the message. The transaction is thus secured independently of the intermediate piece of equipment which could be compromised. End-to-end encryption has become an increasingly popular practice on the Internet.

To this can be added the evolution of the protocols constituting the web services protocol stack, and more particularly the evolution of the transport layer of the OSI (Open Systems Interconnection) model of this protocol stack. The conjunction of these two phenomena contributes in reducing the cooperation between the communication pieces of equipment located at the ends of the connection and the intermediate pieces of equipment or "middlebox", in particular by restricting the activation of functions hosted in the intermediate pieces of equipment. For example, the QUIC (Quick UDP Internet Connections) transport layer protocol, currently being standardised at the IETF (Internet Engineering Task Force), and increasingly used in communication networks, no longer allows insertion of data by the intermediate pieces of equipment such as the enrichment of the headers of the packets used for the data transmission.

The European research NEAT (A New, Evolutive API and Transport-Layer Architecture for the Internet) project aims at developing a new transport system for the Internet provided with an API (Application Programming Interface) easy to use for software developers. This system has the purpose of offering users of connected applications greater reliability as well as a better quality of experience.

Smartphones, laptops and tablets can execute a wide variety of computer programs. Each application has its own requirements for how its data are transported across the Internet and what "transport" functions to activate for the routing and processing of the application data. The communication needs of a sensor application are, for example, different from those of an application for playing continuous or "streaming" video content. This diversity of needs confronts application developers with complex choices, both in terms of the type of networks supported and the configuration of transport protocol parameters and options.

Thus, the API developed within the framework of the NEAT project allows, depending on the connection opening requests of the applications, to select and assemble the transport protocol(s) necessary for the operation of the application.

However, this method is local: this protocol stack is only assembled by the pieces of communication equipment constituting the ends of the connections used for the transport of data relating to the applications.

Consequently, the requests from these applications are not transmitted to the intermediate pieces of equipment which host the desired functions.

There is therefore a need for a technique which does not have such disadvantages.

2. DESCRIPTION OF THE INVENTION

The invention meets this need by proposing a method for discovering at least one function relating to the data transmission, called transmission function, intended to be executed by at least one intermediate node of at least one path established between a first piece of communication equipment and a second piece of communication equipment, said method being executed by said intermediate node and comprising:
 a step of transmitting, to said second piece of communication equipment, at least one parameter representative of said transmission function, the transmission of said parameter representative of said transmission function being triggered by the interception of a signalling message of said path emitted by the first piece of communication equipment to the second piece of communication equipment.

The invention allows to re-establish cooperation between pieces of communication equipment, constituting the ends of a connection, with intermediate nodes, or "middlebox", hosting transmission functions.

Indeed, the invention proposes that an intermediate node belonging to a path established between two pieces of communication equipment provides information relating to the transmission functions, such as a data time-stamping or encryption function, etc., that it is able to execute, in a field of a message transmitted to one of the pieces of equipment constituting one end of the path. For this purpose, the intermediate node does not access the content of the establishment message. Indeed, the interception of the signalling message triggers the transmission by the intermediate node of information relating to these functions. Thus, the communication between the two pieces of communication equipment remains secure even if the intermediate node is compromised.

The invention also applies to the field of virtual machines. In this case, the intermediate nodes can be implemented according to virtual instances proposing transmission functions.

According to a first feature of the invention, the method comprises a step of modifying said signalling message by adding said at least one parameter representative of said transmission function in at least one field of said signalling message.

The intermediate node simply adds information to a field thereof or replaces padding data contained in a field of the message or emits a new message comprising this information.

In the case of an implementation based on the use of the QUIC protocol, the discovery of the available functions is done, for example, by extending the semantics of the message field containing the padding data of the PATH_CHALLENGE messages which corresponds to the establishment message. This message field does not transport any useful data, its length constitutes a test of the supported size of the messages.

According to one feature of the invention, the method comprises a step of transmitting a service message comprising said at least one parameter representative of said transmission function in at least one field of said service message.

According to one feature of the invention, said modified message comprises a list of parameters representative of combinations of transmission functions intended to be executed by the same intermediate node.

The second piece of communication equipment receives a list of each of the transmission functions that can be executed by the intermediate nodes belonging to the path established between the two pieces of communication equipment.

The invention also relates to a method for selecting at least one path established between a first piece of communication equipment and a second piece of communication equipment, said path comprising at least one intermediate node adapted to execute, at the transmission layer, at least one function relating to the data transmission, called transmission function, said method being executed by the second piece of communication equipment and comprising:

- a step of selecting a path through which said data are intended to be transmitted according to at least a first parameter representative of said transmission function and at least one second parameter representative of the type of data intended to be transmitted between the first and the second piece of communication equipment, said selection step being triggered by the reception of at least one message comprising at least one of said first or second parameters,
- a step of emitting an acknowledgement message to the first piece of communication equipment comprising in at least one of its fields at least one parameter representative of the selected path.

The second piece of communication equipment determines, on the basis of the information contained in the establishment message, the path which is to be used for the transmission of data from the first piece of communication equipment.

In the case of an implementation based on the use of the QUIC protocol, the transmission of the available functions to the first piece of communication equipment is done, for example, by extending the semantics of the PATH_RESPONSE messages which correspond to the acknowledgement message.

According to another feature of the invention, said establishment message comprising at least one parameter indicating that said data are intended to be transmitted bidirectionally between the first and the second piece of communication equipment, the method further comprises the following steps executed by said intermediate node:

Intercepting said acknowledgement message,
Activating said at least one transmission function intended to be executed by said intermediate node,
Transmitting said acknowledgement message to the first piece of communication equipment.

When the data transmission between the two pieces of communication equipment and through the selected path is bidirectional, the intermediate nodes intercept the acknowledgement message and activate the transmission function(s) identified in the acknowledgement message that they host. Thus, the data transmitted by the second piece of communication equipment benefit from the appropriate processing operations.

According to another feature of the invention, the acknowledgement message further comprises a parameter for updating a routing file of the first piece of communication equipment, said file being intended to be updated with said at least one parameter representative of the selected path.

In this implementation, the acknowledgement message comprises a message, for example, of the JSON PATCH type. Such a JSON PATCH message indicates that a file needs to be updated and comprises the information needed to update that file. Here, the file to be updated is for example a routing file of the first piece of communication equipment of the proxy.PAC type.

A proxy.PAC type file is a Proxy Automatic Configuration file. Such a file defines, for example, the way in which a web browser or other equivalent functionalities, grouped under the name of "User Agents", connects to the Internet: it allows them to automatically use the appropriate proxy for the requested URL (Uniform Resource Locator).

According to another feature of the invention, said at least one parameter representative of the selected path comprises a list of the transmission functions intended to be executed by said at least one intermediate node.

This implementation is easy to implement.

According to another feature of the invention, said at least one parameter representative of the selected path comprises a list of transmission functions to be executed as well as an identifier of at least one intermediate node adapted to execute each of the listed transmission functions.

In such an implementation, the second piece of communication equipment has already determined the desired transmission functions for data transmission with the first piece of communication equipment.

According to another feature of the invention, said at least one parameter representative of the selected path comprises at least one hash identifying at least one transmission function intended to be executed and at least one intermediate node adapted to execute said at least one transmission function.

In this embodiment of the invention, the second piece of communication equipment identifies the transmission functions or combinations of transmission functions by means of a hash.

Another object of the invention relates to an intermediate node of a path established between a first piece of communication equipment and a second piece of communication equipment, said intermediate node being adapted to execute, at the transmission layer, a function relating to the data transmission, called transmission function, and comprising:

means for intercepting a signalling message of said path emitted by the first piece of communication equipment to the second piece of communication equipment, means for transmitting, to said second piece of communication equipment, at least one parameter representative of said transmission function.

Finally, the invention relates to a piece of communication equipment adapted to select at least one path established between said piece of communication equipment and another piece of communication equipment, said path comprising at least one intermediate node adapted to execute, at the transmission layer, at least one function relating to the data transmission, called transmission function, said piece of communication equipment comprising:

means for receiving at least one message comprising at least one parameter representative of said transmission function and/or at least one parameter representative of the type of data intended to be transmitted between said piece of communication equipment and the other piece of communication equipment, means for selecting a path through which said data are intended to be transmitted according to said at least one parameter representative of said transmission function and said at least one parameter representative of the type of data intended to be transmitted, means for emitting an acknowledgement message to the other piece of communication equipment comprising in at least one of its fields at least one parameter representative of the selected path.

The invention also relates to a computer program product comprising program code instructions for implementing the methods as described above, when they are executed by a processor.

The invention also aims at a computer-readable recording medium on which are recorded computer programs comprising program code instructions for executing the steps of the methods according to the invention as described above.

Such a recording medium can be any entity or device capable of storing the programs. For example, the medium may include a storage means, such as a ROM, for example a CD ROM or a ROM of a microelectronic circuit, or else a magnetic recording means, for example a USB key or a hard disk.

On the other hand, such a recording medium can be a transmissible medium such as an electrical or optical signal, which can be conveyed via an electrical or optical cable, by radio or by other means, so that the computer programs it contains can be executed remotely. The programs according to the invention can in particular be downloaded from a network, for example the Internet network.

Alternatively, the recording medium can be an integrated circuit into which the program is incorporated, the circuit being adapted to execute or to be used in the execution of the detection and selection methods.

3. LIST OF THE FIGURES

Other purposes, features and advantages of the invention will emerge more clearly upon reading the following description, given by way of simple illustrative and non-limiting example, in relation to the figures, among which.

4. DETAILED DESCRIPTION OF EMBODIMENTS OF THE INVENTION

The general principle of the invention is based on the discovery of elementary transmission functions hosted in different intermediate nodes of a communication network through which a path is established between a first piece of communication equipment and a second piece of communication equipment.

Figure 1A:
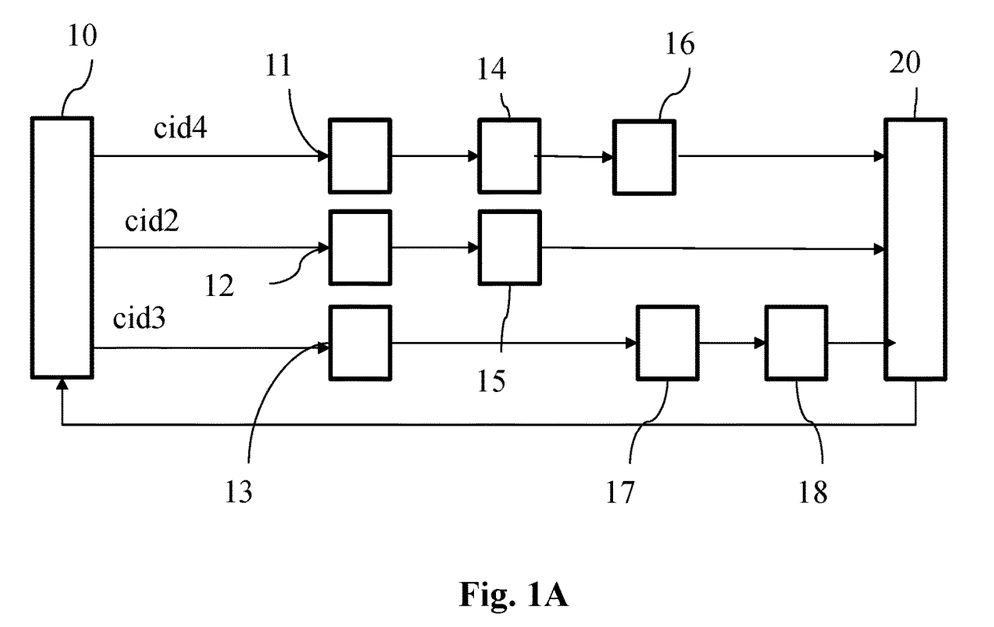
FIG. 1A shows a first system wherein the method according to the invention is implemented.

FIG. 1A shows a first system 1 wherein the method according to the invention is implemented.

The system 1 comprises a first piece of communication equipment 10, such a piece of communication equipment 10 is for example a domestic gateway such as a LiveBox®, a "smartphone" type mobile telephone, a digital decoder or "Set Top Box", etc.

The system 1 comprises a plurality of intermediate nodes 11-18 located in one or more communication networks. Such intermediate nodes 11-18 are for example elements of a mobile network (MEC (Mobile Edge Computing), C-RANs (Cloud Radio Access Networks)), routers, gateways provided with transport functions or application functions, or proxies. The intermediate nodes 11-18 host one or more transmission functions.

Finally, the system 1 comprises a second piece of communication equipment 20 such as a server for example.

Several communication paths cid2, cid3, cid4, through which data are intended to be transmitted, are established or in the process of being established between the first piece of communication equipment 10 and the second piece of communication equipment 20. These various communication paths cid2, cid3, cid4 are established through one or more intermediate nodes 11-18. The first communication path cid3 is established through the intermediate nodes 13, 17 and 18. The second communication path cid2 is established through the intermediate nodes 12 and 15. The third communication path cid4 is in the process of being established through the intermediate nodes 11, 14 and 16.

Such communication paths cid2, cid3, cid4 being established between the first piece of communication equipment 10 and the second piece of communication equipment 20, only these two pieces of communication equipment 10, 20 can access the content of the data transmitted on the paths cid2, cid3, cid4. Thus, the intermediate nodes 11-18 do not access the data transmitted through the paths cid2, cid3, cid4, they simply transmit them to the following piece of equipment, either another intermediate node, or the second piece of communication equipment 20. It is understood that some data called routing data are accessible to intermediate pieces of equipment for routing the data but not the data comprised, for example, in transport or application fields of the messages.

Figure 1B:
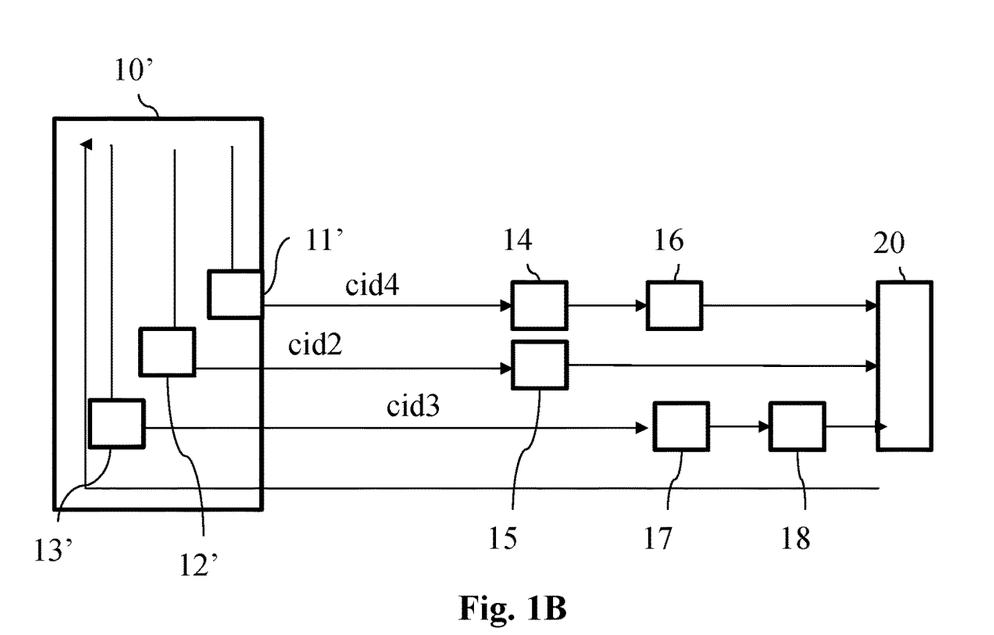
FIG. 1B shows a second system wherein the method according to the invention is implemented.

FIG. 1B shows a second system 1' wherein the method according to the invention is implemented. The elements already described with reference to FIG. 1A have the same reference numerals.

The system 1' comprises a first piece of communication equipment 10', such a piece of communication equipment 10' is for example a computer capable of executing several virtual machines.

The system 1 comprises a plurality of intermediate nodes 11', 12', 13' and 14-18. The intermediate nodes 11'-13' are virtual machines hosted in the first intermediate piece of equipment 10'. The intermediate nodes 14-18 are located in one or more communication networks. Such intermediate nodes 14-18 are for example routers. The intermediate nodes 11', 12', 13' and 14-18 are capable of performing one or more transmission functions.

Finally, the system 1' comprises a second piece of communication equipment 20 such as a server for example.

Several communication paths cid2, cid3, cid4, through which data are intended to be transmitted, are established or in the process of being established between the first piece of communication equipment 10' and the second piece of communication equipment 20. These different communication paths cid2, cid3, cid4 are established through one or more intermediate nodes 11', 12', 13' and 14-18. The first communication path cid3 is established through the intermediate nodes 13', 17 and 18. The second communication path cid2 is established through the intermediate nodes 12' and 15. The third communication path cid4 is in the process of being established through the intermediate nodes 11', 14 and 16.

Such communication paths cid2, cid3, cid4 being established between the first piece of communication equipment 10' and the second piece of communication equipment 20, only these two pieces of communication equipment 10', 20 can access the content of the transmitted data. Thus, the intermediate nodes 11', 12', 13' and 14-18 do not access the data transmitted through the paths cid2, cid3, cid4, they simply transmit them to the following piece of equipment, that is to say another intermediate node or the second piece of communication equipment 20.

Figure 2:
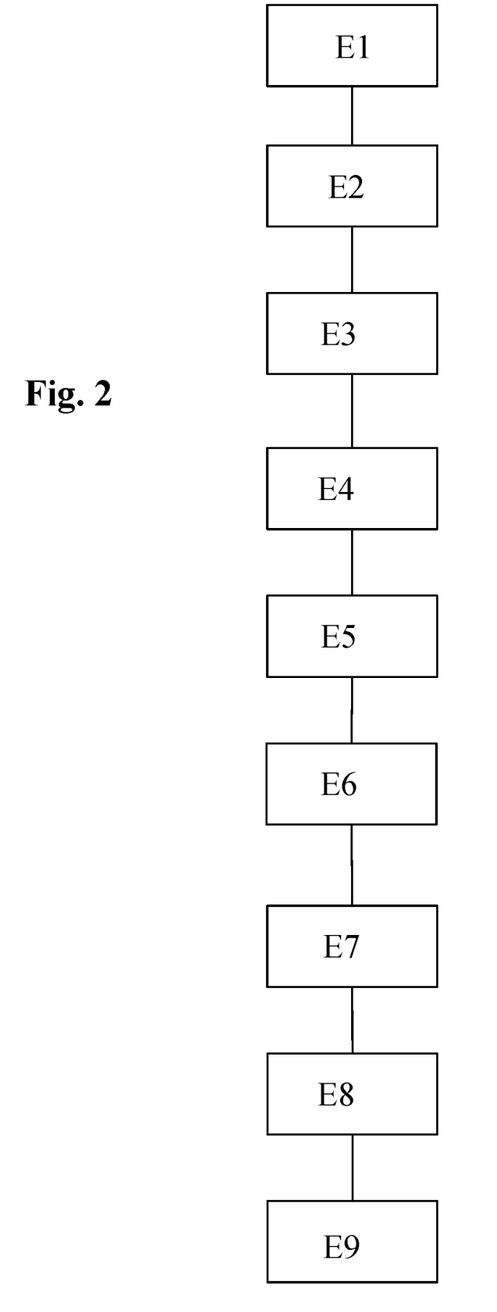
FIG. 2 shows the steps of the method according to the invention.

FIG. 2 shows the steps of the method according to the invention when it is implemented by the various pieces of equipment constituting the system 1 or the system 1'.

The method is described for a data transmission from the first piece of communication equipment 10, 10' to the second piece of communication equipment 20. The method according to the invention also applies to a data transmission from the second piece of communication equipment 20 to the first piece of communication equipment 10, 10'. In such a case, the steps executed by the first piece of communication equipment 10, 10' are then executed by the second piece of communication equipment 20 and conversely the steps executed by the second piece of communication equipment 20 are then executed by the first piece of communication equipment 10, 10'.

The method object of the invention is described in the context where the piece of communication equipment 10 discovers a new path, the path cid4, to the second piece of communication equipment 20 following the activation of a Wi-Fi connection (Wireless Fidelity). In one embodiment of the invention, the pieces of communication equipment 10, 20 implement the QUICv1 transport protocol.

In such a context, a multipath connection is established in accordance with the UDP (User Datagram Protocol) protocol between the first and the second piece of communication equipment 10, 10', 20 and is identified by a connection identifier. Once this multipath connection is established, several paths belonging to this multipath connection can be established between the first piece of communication equipment 10, 10' and the second piece of communication equipment 20. Each path is identified by a quintuplet comprising: a source address, a destination address, a source port, a destination port and an identifier "cid" of the path in the multipath connection.

In other embodiments of the invention, other transport protocols can be used to establish a multipath connection, such as the protocol TCP (Transmission Control Protocol), MPTCP (Multipath TCP), SCTP (Stream Control Transmission Protocol) or a combination of these protocols.

In a first step E1 of the method according to the invention, the first piece of transmission equipment 10, 10' emits, to the second piece of communication equipment 20, a path signalling message, such as a Path_Challenge message, through a new path cid4 to be added to the multipath connection established between the first piece of communication equipment 10, 10' and the second piece of communication equipment 20. Such a multipath connection already comprises the path cid3 and the path cid2.

A Path_Challenge message is a message allowing the establishment of a path between two pieces of communication equipment and the verification of the features of the path. A Path_Challenge message can be emitted periodically on an established path.

In a step E2, the intermediate node 11, 11' intercepts the signalling message transmitted by the first piece of communication equipment 10, 10' on the path cid4.

In a step E3, the intermediate node 11, 11' transmits at least one parameter representative of at least one transmission function or at least one combination of transmission functions hosted in the intermediate node 11, 11'. Referring to FIGS. 1A t 1B, the intermediate node 11, 11' hosts a function A.

The transmission functions hosted in the intermediate nodes are for example elementary transport functions:

TABLE 1

| TP | name of the function | supported? |
|----|---------------------|------------|
| 1  | Unicast             | 0          |
| 2  | Mcast/IPv4Bcast     | 0          |
| 3  | Port Mux            | 0          |
| 4  | Connected           | 0          |
| 5  | Data bundling       | 0          |
| 6  | Feature Nego        | 0          |
| 7  | Data priority       | 0          |
| 8  | Data bundling       | 0          |
| 9  | Reliability         | 0          |
| 10 | Ordered deliv       | 0          |
| 11 | Corruption Tol.     | 0          |
| 12 | Flow Control        | 0          |
| 13 | PMTU/PLPMTU         | 0          |
| 14 | Cong Control        | 0          |
| 15 | ECN Support         | 0          |
| 16 | NAT support         | 0          | or else elementary transport security functions:

TABLE 2

| TS | name of the function | supported? |
|----|---------------------|------------|
| 1  | Forward-secure segment encryption and authentication | 0 |
| 2  | Private key interface or injection | 0 |
| 3  | Mutual authentication | 0 |
| 4  | Endpoint authentication | 0 |
| 5  | Identity Validation | 0 |
| 6  | Source Address Validation | 0 |
| 7  | Pre-Shared Key Export | 0 |
| 8  | Pre-Shared Key Import | 0 |
| 9  | Encrypt application data | 0 |
| 10 | Decrypt application data | 0 |
| 11 | Application-layer feature negotiation | 0 |
| 12 | Configuration extensions | 0 |
| 13 | Session caching and management | 0 |
| 14 | Connection mobility | 0 |

TABLE 2-continued

| TS | name of the function | supported? |
|---|---|---|
| 15 | Key Update | 0 |
| 16 | Key Expiration | 0 |
| 17 | Session Cache | 0 |
| 18 | Authentication Delegation | 0 |
| 19 | Supported Algorithms (Key Exchange, Signatures, and Ciphersuites) | 0 |
| 20 | Identity and Private Keys | 0 |
| 21 | Send Handshake Messages | 0 |
| 22 | Receive Handshake Messages | 0 | or else elementary application functions:

TABLE 3

| APP | name of the function | supported? |
|---|---|---|
| 1 | caching | 0 |
| 2 | compression | 0 |
| 3 | datation | 0 |
| 4 | cooperation | 0 |
| 5 | streaming | 0 |

In a first embodiment of the invention, the intermediate node 11, 11' modifies the signalling message by adding the parameter representative of the transmission function in a field of the signalling message provided for this purpose. The intermediate node 11, 11' does not access the content of the signalling message received, it simply adds information in a specific field of this message.

In a second embodiment of the invention, the intermediate node 11, 11' emits a service message comprising in at least one of its fields the parameter representative of the transmission function. Such a service message can be concatenated with the signalling message using, for example, a concatenation technique such as that described in the IETF working document called "The Concatenation of IP Packets draft-moon-ipsec-ipconc-00.txt" dated Dec. 2, 2002 and available at the following URL: https://tools.ietf.org/html/draft-moon-ipsec-inconc-00.

The purpose of such a concatenation technique is to reduce the number of Internet Protocol (IP) packets intended to be transmitted.

The parameter representative of the transmission function is, in one embodiment of the invention, in the form of a 32-bit register for example. A message can contain as many registers as there are transmission function types, for example a register containing parameters representative of transport functions, a register containing parameters representative of transport security functions and a register containing parameters representative of application functions.

When the method according to the invention is implemented in accordance with the QUIC protocol, the semantics of the Path_Challenge type messages is extended in order to be able to add the registers in the signalling message or in the service message.

The steps E2 and E3 are executed by each intermediate node 11, 11', 14, 16 through which the path cid4 is established.

In a step E4, the second piece of communication equipment 20 receives the signalling message and, according to the embodiment of the invention, the service message.

The signalling message comprises at least a first parameter representative of the type of data intended to be transmitted between the first and the second piece of communication equipment 10, 10', 20 and a second parameter indicating whether the data transmission between the first and the second piece of communication equipment 10, 10', 20 is bidirectional.

In a step E5, the second piece of communication equipment 20 selects, on the basis of the first parameter representative of the type of data intended to be transmitted between the first and the second piece of communication equipment 10, 10', 20 and parameters representative of the various transmission functions or combinations of transmission functions received in the signalling message or in the service message, a path cid3, cid2 or cid4 through which the data identified by the first parameter are intended to be transmitted.

In a step E6, the second piece of equipment 20 emits an acknowledgement message, of the Path_Response type, to the first piece of equipment. This acknowledgement message comprises in at least one of its fields at least one parameter representative of the selected path. In one embodiment of the invention, the acknowledgement message also comprises the second parameter indicating that the data transmission between the first and the second piece of communication equipment 10, 10', 20 is bidirectional.

In one embodiment of the invention, upon reception of the acknowledgement message, the first piece of communication equipment 10, 10' determines the path which is used for the data transmission between the first piece of communication equipment 10, 10' and the second piece of communication equipment 20.

In the case where the data transmission is bidirectional, the intermediate node 16 intercepts the acknowledgement message during a step E7.

In a step E8, the intermediate node 16 activates the transmission function(s) intended to be executed by said intermediate node 16 and identified in the acknowledgement message.

In a first embodiment, the intermediate node 16 activates the transmission function(s) intended to be executed for the data emitted by the first piece of communication equipment 10, 10' to the second piece of communication equipment 20.

In a second embodiment, the intermediate node 16 activates the transmission function(s) intended to be executed for the data emitted by the second piece of communication equipment 20 to the first piece of communication equipment 10, 10'.

In the first and second embodiments, the data are transmitted bidirectionally between the first and the second piece of communication equipment 10, 10', 20 but are not transmitted through the same path depending on whether the data were emitted by the first piece of communication equipment 10, 10' or the second piece of communication equipment 20. Thus, the intermediate nodes of the concerned paths activate their functions according to the piece of communication equipment which emits the data which will pass through the path. For example, the data emitted by the first piece of communication equipment 10, 10' are transmitted to the second piece of communication equipment 20 through a path comprising the intermediate nodes 11, 14, 17 and 18. These intermediate nodes activate the/their transmission function(s) for the direction of transmission from the first piece of communication equipment 10, 10' to the second piece of communication equipment 20. The data emitted by the second piece of communication equipment 20 are, in turn, transmitted to the first piece of communication equipment 10, 10' through a path comprising the intermediate nodes 11 and 14. These intermediate nodes activate the/their transmission function(s) for the direction of transmission from the second piece of communication equipment 20 to the first piece of communication equipment 10, 10'.

Finally, in a third embodiment, the data are transmitted bidirectionally and symmetrically between the first and the second piece of communication equipment 10, 10', 20. The data emitted by the first and the second piece of communication equipment 10, 10', 20 are transmitted through the same path. In this third embodiment, the intermediate node 16 activates the transmission function(s) for both directions of transmission.

In a step E9, the intermediate node 16 transmits the acknowledgement message to the first piece of communication equipment 10, 10'.

Steps E7 to E9 are executed by each intermediate node 14, 11, 11', through which the path cid4 is established. Thus, the data transmitted by the second piece of communication equipment 20 benefit from the appropriate processing operations.

In a first embodiment, the acknowledgement message comprises an identifier of the sectioned path and a list of transmission functions to be activated when transmitting data through the path: Path_Response (cid4: ABC).

In a second embodiment, the acknowledgement message further comprises a parameter for updating a routing file of the first piece of communication equipment 10, 10', said file being intended to be updated with said at least one parameter representative of the selected path.

In this implementation, the acknowledgement message comprises a JSON PATCH type message. Such a JSON PATCH message indicates that a file needs to be updated and comprises the information needed to update that file. Here, the file to be updated is for example a routing file of the first piece of communication equipment of the proxy.PAC type. The acknowledgement message comprises, for example, the following information: Path_Response ({"op": "add", "path": "coap", "value": {"PROXY": iot-proxy.mydomain.com:443}}).

A proxy.PAC type file is a Proxy Automatic Configuration file. Such a file defines, for example, the way wherein a web browser or other equivalent functionalities, grouped under the name of "User Agents", connects to the Internet: it allows them to automatically use the appropriate proxy for the Requested URL In a third embodiment, the data transmitted between the first piece of communication equipment 10, 10' and the second piece of communication equipment need to be time-stamped.

The second piece of communication equipment 20 receives a list of elementary functions hosted by the various intermediate nodes: the intermediate node 11 hosts the "APP.4" function, the intermediate node 12 hosts the "TS.10" function, the intermediate node 14 hosts the "APP.3" function, the intermediate node 15 hosts the "APP.4" function, the intermediate node 16 hosts the "APP.4" function; the intermediate node 17 hosts the "TS.9" function. Thus, the intermediate nodes announce their capacities to cooperate (APP.4), to date (APP.3), to decrypt (TS.10) and to encrypt (TS.9).

In its acknowledgement message, the second piece of communication equipment 20 indicates to the first piece of communication equipment 10, 10' to route the requests of the "coaps://" type through the path cid4 while explicitly specifying to have them dated by the intermediate node 14:
{scheme: 'coaps', cid:'cid4', combo: {decrypt:'TS.10', datation: 'APP.3', encrypt: 'TS.9'}}

When the data transmission between the first and the second piece of communication equipment 10, 10', 20 is bidirectional, the intermediate nodes identify the functions required in order to activate them. According to their management rules, the intermediate nodes can remove some function combinations which do not suit them, for example when there is an incompatibility of the order of the functions: 'A.TS.10' is incompatible with 'C.TS.9' since the decryption must be performed before encryption, etc.

Finally, in a fourth embodiment, a parameter representative of the selected path comprises at least one hash identifying at least one transmission function intended to be executed and at least one intermediate node adapted to execute said at least one transmission function.

In this embodiment of the invention, the second piece of communication equipment 20 identifies the transmission functions or the combinations of transmission functions by means of a hash.

For example, the transmission function A.TS.10 is identified by the hash ' RZQzaYTvAfGkrK8o9KTnLBvU3AS VYWmJlg9bqq/kNQM=', the transmission function B.APP.3 is identified by the hash 'N3U/ OXkuAhtBnG9mgqyS9AlGQ pIRwoJsc3XqLfaaiVM=' and the transmission function C.TS.9 is identified by the hash 'uiYsiHicU+P1Hm5BZiDe3Df64oGD4FnK+ Ge8lRtFlk='.

The acknowledgement message contains the following parameters:
{
  scheme: 'coaps',
  cid: 'cid4',
  combo: [
    'RZQzaYTvAfGkrK8o9KTnLBvU3ASVYWmJlg
      9bqq/kNQM=,
    'N3U/OXkuAhtBnG9mgqyS9AlGQpIRwoJsc
      3XgLfaaiVM=,
    'uiYsiHicU+P1Hm5BZiDe3Df64oGD4FnK+
      qGe8lRtFlk='
  ]
}

In the present case, each hash corresponds to an elementary function of a very precise intermediate node of the path cid4 (A.TS.10, B.APP.3 and C.TS.9.). Only entities knowing the shared secret 'pwdcltsrv', the name of the intermediate nodes and the name of the transmission functions can generate the identifiers of the requested functions.

In the case of a bidirectional transmission, the intermediate nodes knowing the shared secret, that is to say the hash values, interpret the acknowledgement messages and identify the requested transmission functions in order to activate them.

Continuing with the previous example, the composite transmission function 'TS.10,APP.3,TS.9' (decrypt, date and encrypt) is identified by the JWT hash 'sltZFWJwSmXeByiyKGwN260vZHChqa5QIvSrDjlRNO M=.

The first piece of communication equipment 10, 10' receives the indication, in the acknowledgement message, to route the requests from the "coaps://" scheme to the composite function through the path cid3 or the path cid4:
{combo: 'sltZFWJwSmXeByiyKGwN260vZHChqa5 QIvSrDjlRNOM=', cid:'cid3'}
{combo: 'sltZFWJwSmXeByiyKGwN260vZHChqa5 QIvSrDjlRNOM=', cid:'cid4'}

Thus, the first piece of communication equipment 10, 10' routes the 'coaps://' requests either in the paths cid4 or cid3.

Figure 3:
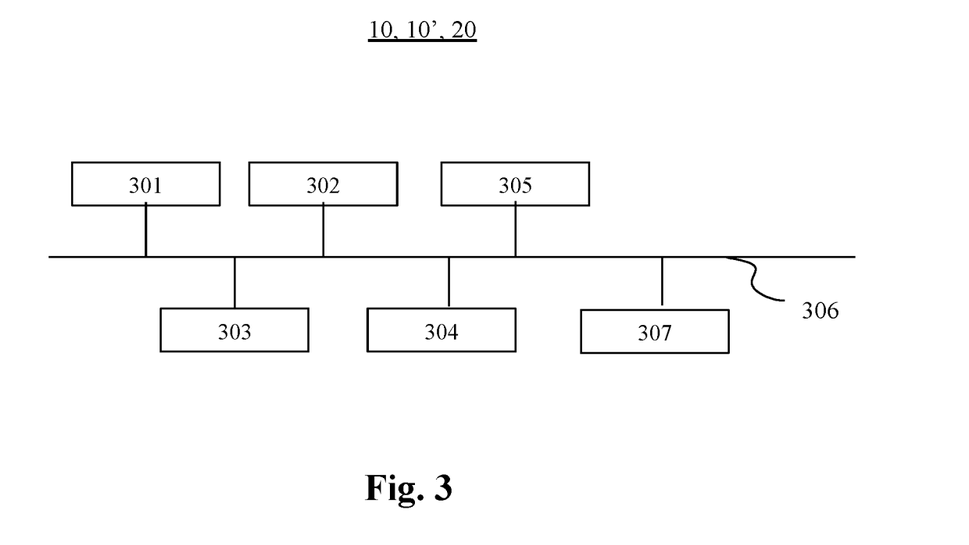
FIG. 3 schematically shows a piece of communication equipment.

FIG. 3 schematically shows a piece of communication equipment 10, 10', 20.

The piece of communication equipment 10, 10', 20, may comprise at least one hardware processor 301, a storage unit 302, an input device 303, a display device 304, an interface unit 305, and a network interface 307 which are connected to each other through a bus 306. Of course, the constituent elements of the piece of communication equipment 10, 10', 20 can be connected by means of a connection other than a bus.

The processor 301 controls the operations of the piece of communication equipment 10, 10', 20. The storage unit 302 stores at least one program for selecting a path, to be executed by the processor 301, and various data, such as parameters used for calculations performed by processor 301, intermediate data of calculations performed by the processor 301, etc. The processor 301 can be formed by any known and suitable hardware or software, or by a combination of hardware and software. For example, the processor 301 can be formed by a dedicated hardware such as a processing circuit, or by a programmable processing unit such as a central processing unit which executes a program stored in a memory of the latter.

The storage unit 302 may be formed by any suitable means capable of storing the program, data in a computer-readable manner. Storage unit 302 examples comprise computer-readable non-transient storage media such as solid-state memory devices, and magnetic, optical, or magneto-optical recording media loaded in a read and write unit. The program causes the processor 301 to execute a path selection method according to one embodiment of the invention.

The input device 303 may be formed by a keyboard, a pointing device such as a mouse to be used by a user to enter controls. The display device 304 can be formed by a display device for displaying, such as for example a graphical user interface (GUI). The input device 303 and the display device 304 can be integrally formed by means of a touch screen, for example.

The interface unit 305 provides an interface between the piece of communication equipment 10, 10', 20 and an external apparatus. The interface unit 305 can communicate with the external apparatus via a wired or wireless connection. Such an external apparatus is for example a digital decoder or a "smartphone".

A network interface 307 provides a connection between the piece of communication equipment 10, 10', 20 and an intermediate node via a communication network, such as the Internet. The network interface 307 can provide, depending on its nature, a wired or wireless connection to the network.

Figure 4:
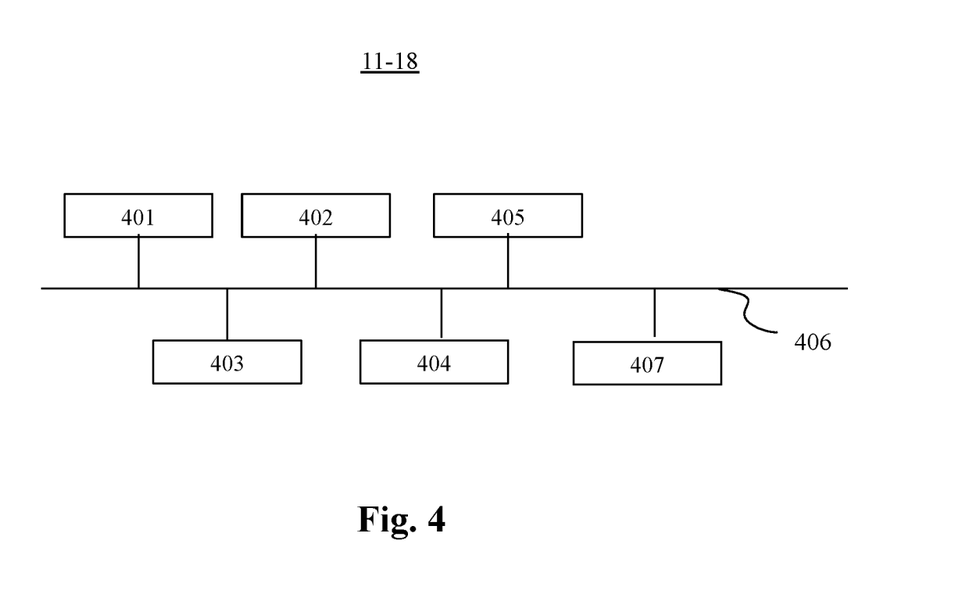
FIG. 4 schematically shows an intermediate node.

FIG. 4 schematically shows an intermediate node 11-18.

The intermediate node 11-18, may comprise at least a hardware processor 401, a storage unit 402, an input device 403, a display device 404, an interface unit 405, and a network interface 407 which are connected to each other through a bus 406. Of course, the elements constituting the intermediate node 11-18 can be connected by means of a connection other than a bus.

The processor 401 controls the operations of the intermediate node 11-18. The storage unit 302 stores at least one program for discovering a transmission function, to be executed by the processor 401, and various data, such as parameters used for calculations performed by the processor 401, intermediate data of calculations performed by the processor 401, etc. The processor 401 can be formed by any known and suitable hardware or software, or by a combination of hardware and software. For example, the processor 401 can be formed by a dedicated hardware such as a processing circuit, or by a programmable processing unit such as a central processing unit which executes a program stored in a memory thereof.

The storage unit 402 may be formed by any suitable means capable of storing the program, and data in a computer-readable manner. Storage unit 402 examples comprise computer-readable non-transient storage media such as solid-state memory devices, and magnetic, optical, or magneto-optical recording media loaded in a read and write unit. The program causes the processor 401 to execute a method for discovering a transmission function according to one embodiment of the invention.

The input device 403 may be formed by a keyboard, a pointing device such as a mouse to be used by a user to enter controls. The display device 404 can be formed by a display device for displaying, such as for example a graphical user interface (GUI). The input device 403 and the display device 404 can be integrally formed by means of a touch screen, for example.

The interface unit 405 provides an interface between the intermediate node 11-18 and an external apparatus. The interface unit 405 can communicate with the external apparatus via a wired or wireless connection. Such an external apparatus is for example a laptop computer.

A network interface 407 provides a connection between the intermediate node 11-18 and another intermediate node 11-18 via a communications network, such as the Internet. The network interface 407 can provide, depending on its nature, a wired or wireless connection to the network.

The invention claimed is:

1. A method for discovering at least one function relating to a data transmission, called a transmission function, to be executed by at least one intermediate node of at least one path established between a first piece of communication equipment and a second piece of communication equipment, said method being executed by said intermediate node and comprising:
   intercepting a signalling message of said path emitted by the first piece of communication equipment to the second piece of communication equipment; and
   transmitting, to said second piece of communication equipment, at least one parameter representative of said transmission function, said at least one parameter being determinant in a selection of a path among the at least one path established between the first and second pieces of communication equipment by the second piece of communication equipment, the transmission of said parameter representative of said transmission function being triggered by the interception of the signalling message,
   wherein the transmission function is hosted by the at least one intermediate node and corresponds to an elementary transport function, an elementary transport security function or an elementary application function.

2. The method according to claim 1, further comprising modifying said signalling message by adding said at least one parameter representative of said transmission function in at least one field of said signalling message.

3. The method according to claim 2, wherein modifying said signalling message comprises replacing pieces of padding information comprised in a field of said signalling message by said at least one parameter representative of said transmission function.

4. The method according to claim 1, further comprising transmitting a service message comprising said at least one parameter representative of said transmission function in at least one field of said service message.

5. The method according to claim 1, wherein the parameter representative of said transmission function comprises a list of parameters representative of combinations of transmission functions to be executed by the same intermediate node.

6. The method according to claim 1, wherein said signalling message is transmitted between the first and the second piece of communication equipment when establishing said path.

7. A method for selecting at least one path established between a first piece of communication equipment and a second piece of communication equipment, said path comprising at least one intermediate node adapted to execute at least one function relating to a data transmission, called a transmission function, said method being executed by the second piece of communication equipment and comprising:

receiving at least one message comprising a first parameter representative of said transmission function and at least one second parameter representative of a type of data to be transmitted between the first and the second piece of communication equipment;

selecting a path among the at least one path established between the first and second pieces of communication equipment through which said data are to be transmitted according to at least the first parameter and the second parameter, said selecting being triggered by reception of the at least one message comprising said first and second parameters, and emitting an acknowledgement message to the first piece of communication equipment comprising in at least one of its fields at least one parameter representative of the selected path, wherein the transmission function is hosted by the at least one intermediate node and corresponds to an elementary transport function, an elementary transport security function or an elementary application function.

8. The method according to claim 7 wherein, said at least one received message being a signalling message of said path comprising at least one parameter indicating that said data are to be transmitted bidirectionally between the first and the second piece of communication equipment, the method further comprises the following steps executed by said intermediate node:

intercepting said acknowledgement message,
activating said at least one transmission function to be executed by said intermediate node,
transmitting said acknowledgement message to the first piece of communication equipment.

9. The method according to claim 7 wherein the acknowledgement message further comprises a parameter for updating a routing file of the first piece of communication equipment, said file being intended to be updated with said at least one parameter representative of the selected path.

10. The method according to claim 7 wherein said at least one parameter representative of the selected path comprises a list of the transmission functions to be executed by said at least one intermediate node.

11. The method according to claim 7 wherein said at least one parameter representative of the selected path comprises a list of transmission functions to be executed as well as an identifier of at least one intermediate node adapted to execute each of the listed transmission functions.

12. The method according to claim 7 wherein said at least one parameter representative of the selected path comprises at least one hash identifying at least one transmission function intended to be executed and at least one intermediate node adapted to execute said at least one transmission function.

13. An intermediate node of a path established between a first piece of communication equipment and a second piece of communication equipment, said intermediate node being adapted to execute a function relating to a data transmission, called a transmission function, and comprising:

a processor; and
a non-transitory computer-readable medium comprising instructions stored thereon which when executed by the processor configure the intermediate node to:
intercept a signalling message of said path emitted by the first piece of communication equipment to the second piece of communication equipment; and
transmit, to said second piece of communication equipment, at least one parameter representative of said transmission function, said at least one parameter being determinant in a selection of a path among at least one path established between the first and second pieces of communication equipment by the second piece of communication equipment, the transmission of said parameter representative of said transmission function being triggered by the interception of the signalling message, and
wherein the transmission function is hosted by the intermediate node and corresponds to an elementary transport function, an elementary transport security function or an elementary application function.

14. A piece of communication equipment adapted to select at least one path established between said piece of communication equipment and another piece of communication equipment, said path comprising at least one intermediate node adapted to execute at least one function relating to a data transmission, called a transmission function, said piece of communication equipment comprising:

a processor; and
a non-transitory computer-readable medium comprising instructions stored thereon which when executed by the processor configure the intermediate node to:
receive at least one message comprising at least one parameter representative of said transmission function and at least one parameter representative of a type of data to be transmitted between said piece of communication equipment and the other piece of communication equipment,
select a path among the at least one path established between the piece of communication equipment and the other piece of communication equipment through which said data are to be transmitted according to said at least one parameter representative of said transmission function and said at least one parameter representative of the type of data to be transmitted, said selecting being triggered by reception of the at least one message, and
emit an acknowledgement message to the other piece of communication equipment comprising in at least one of its fields at least one parameter representative of the selected path, and
wherein the transmission function is hosted by the at least one intermediate node and corresponds to an elementary transport function, an elementary transport security function or an elementary application function.

15. A non-transitory computer-readable medium comprising program code instructions stored thereon for implementing a method for discovering at least one function, when the instructions are executed by a processor of an intermediate node of at least one path established between a first piece of communication equipment and a second piece of communication equipment, the least one function relating to a data transmission, called a transmission function, to be executed by the intermediate node, wherein the instructions configure the intermediate node to:

intercept a signalling message of said path emitted by the first piece of communication equipment to the second piece of communication equipment; and transmit, to said second piece of communication equipment, at least one parameter representative of said transmission function, said at least one parameter being determinant in a selection of a path among the at least one path established between the first and second pieces of communication equipment by the second piece of communication equipment, the transmission of said parameter representative of said transmission function being triggered by the interception of the signalling message, and wherein the transmission function is hosted by the intermediate node and corresponds to an elementary transport function, an elementary transport security function or an elementary application function.

16. A non-transitory computer-readable medium comprising program code instructions for implementing a method for selecting at least one path established between a first piece of communication equipment and a second piece of communication equipment, when the instructions are executed by a processor of the second piece of communication equipment, said path comprising at least one intermediate node adapted to execute at least one function relating to a data transmission, called a transmission function, wherein the instructions configure the second piece of communication equipment to:

receiving at least one message comprising a first parameter representative of said transmission function and at least one second parameter representative of a type of data to be transmitted between the first and the second piece of communication equipment;

select a path among the at least one path established between the first and second pieces of communication equipment through which said data are to be transmitted according to at least the first parameter and the second parameter, said selecting being triggered by reception of the at least one message comprising said first and second parameters, and emit an acknowledgement message to the first piece of communication equipment comprising in at least one of its fields at least one parameter representative of the selected path, and wherein the transmission function is hosted by the at least one intermediate node and corresponds to an elementary transport function, an elementary transport security function or an elementary application function.

17. The method according to claim 1, further comprising:
intercepting an acknowledgement of the path selected from the second piece of communication equipment,
wherein the data transmission between the first piece of communication equipment and the second piece of communication equipment is bidirectional.

18. The method according to claim 17, further comprising, subsequently to intercepting the acknowledgement:
activating the transmission function intended to be executed by said intermediate node and identified in the acknowledgement message; and
processing data transmitted from at least one of the first or second pieces of equipment to the other of the first or second pieces of communication equipment using the transmission function.

* * * * *